US011393331B2

(12) United States Patent
Ikeler et al.

(10) Patent No.: US 11,393,331 B2
(45) Date of Patent: Jul. 19, 2022

(54) REMOTE MONITORING AND CONTROL OF MOVABLE BARRIER STATUS

(71) Applicant: GMI Holdings, Inc., Mount Hope, OH (US)

(72) Inventors: Tim Ikeler, Alliance, OH (US); Leroy G. Krupke, Carrollton, TX (US); Brent Buescher, Wooster, OH (US); Brent Alan Rauscher, Keller, TX (US); Gregory D. Matias, Copley, OH (US); Michael Dragomier, North Canton, OH (US)

(73) Assignee: GMI Holdings, Inc., Mount Hope, OH (US)

( * ) Notice: Subject to any disclaimer, the term of this patent is extended or adjusted under 35 U.S.C. 154(b) by 12 days.

(21) Appl. No.: 16/237,157

(22) Filed: Dec. 31, 2018

(65) Prior Publication Data

US 2019/0139400 A1    May 9, 2019

Related U.S. Application Data

(63) Continuation-in-part of application No. 15/800,510, filed on Nov. 1, 2017, now Pat. No. 10,540,889.
(Continued)

(51) Int. Cl.
*H02K 7/14* (2006.01)
*G08C 23/00* (2006.01)
(Continued)

(52) U.S. Cl.
CPC .............. *G08C 23/00* (2013.01); *E05F 15/40* (2015.01); *E05F 15/668* (2015.01); *E05F 15/77* (2015.01); *H04L 67/125* (2013.01); *E05Y 2400/32* (2013.01); *E05Y 2400/334* (2013.01); *E05Y 2400/458* (2013.01); *E05Y 2400/81* (2013.01); *E05Y 2900/106* (2013.01)

(58) Field of Classification Search
CPC ... G08C 23/04; G08C 2201/50; E05F 15/668; G07C 9/00119
USPC .......................................................... 318/3
See application file for complete search history.

(56) References Cited

U.S. PATENT DOCUMENTS 3,262,105 A    7/1966    Bell
4,338,553 A    7/1982    Scott, Jr.
(Continued)

FOREIGN PATENT DOCUMENTS

CH            707464 A2    7/2014
WO    WO-2006/066213 A2    6/2006

OTHER PUBLICATIONS

European Search Report in corresponding European Patent Application No. 18171888.3, dated Oct. 1, 2018, 9 pages.
(Continued)

*Primary Examiner* — Kawing Chan
*Assistant Examiner* — Gabriel Agared
(74) *Attorney, Agent, or Firm* — Haynes and Boone, LLP

(57) ABSTRACT

A system for moving a barrier includes a motor with an integrated encoder operative to generate pulses as a function of rotation of the rotatable shaft of the motor. A preferred form of encoder is a rotary optical encoder to generate optical pulses as a function of rotational movement of the rotatable shaft. Both a microcontroller to determine door status and a controller to control door movement receive the pulses and separately execute methods in response thereto.

18 Claims, 14 Drawing Sheets

Related U.S. Application Data

(60) Provisional application No. 62/513,943, filed on Jun. 1, 2017, provisional application No. 62/505,711, filed on May 12, 2017.

(51) Int. Cl.
*E05F 15/668* (2015.01)
*H04L 67/125* (2022.01)
*E05F 15/40* (2015.01)
*E05F 15/77* (2015.01)

(56) References Cited

U.S. PATENT DOCUMENTS

| | | | |
|---|---|---|---|
| 5,039,925 A | 8/1991 | Schap | |
| 6,229,276 B1 | 5/2001 | Fitzgibbon et al. | |
| 6,376,832 B1 | 4/2002 | Smith et al. | |
| 6,495,983 B1* | 12/2002 | Stern | G05B 19/42 |
| | | | 318/567 |
| 6,879,122 B1* | 4/2005 | Stewart | E05F 15/668 |
| | | | 318/280 |
| 6,998,977 B2 | 2/2006 | Gregori et al. | |
| 7,071,813 B2 | 7/2006 | Fitzgibbon | |
| 7,224,275 B2 | 5/2007 | Fitzgibbon | |
| 8,587,404 B2* | 11/2013 | Laird | E05F 15/684 |
| | | | 340/5.7 |
| 2002/0183008 A1 | 12/2002 | Menard et al. | |
| 2006/0197481 A1* | 9/2006 | Hotto | E05F 15/668 |
| | | | 318/280 |
| 2010/0127882 A1* | 5/2010 | Sitarski | E05F 15/77 |
| | | | 340/686.1 |
| 2012/0297681 A1* | 11/2012 | Krupke | F16B 7/0433 |
| | | | 49/324 |
| 2014/0320263 A1 | 10/2014 | Fan et al. | |
| 2015/0084779 A1* | 3/2015 | Saladin | H04W 4/029 |
| | | | 340/686.6 |
| 2016/0281411 A1* | 9/2016 | Calagaz, Jr. | E05F 15/76 |

OTHER PUBLICATIONS

Non-Final Office Action on U.S. Appl. No. 15/800,510 dated May 23, 2018.

European Patent Office, European Office Action, for Application No. 18 171 888.3-1005, dated Mar. 26, 2020, 4 pages.

* cited by examiner

REMOTE MONITORING AND CONTROL OF MOVABLE BARRIER STATUS

CROSS REFERENCE TO RELATED APPLICATION

This application claims the benefit of, priority to, and is a Continuation-in-Part of, U.S. Non-Provisional patent application Ser. No. 15/800,510, filed on Nov. 1, 2017 and entitled "REMOTE MONITORING AND CONTROL OF MOVABLE BARRIER STATUS", which claims the benefit of and priority to U.S. Provisional Application Nos. 62/505,711 and 62/513,943, both titled "REMOTE NETWORK MONITORING AND CONTROL OF A MOVABLE BARRIER" filed May 12, 2017, and Jun. 1, 2017, respectively, all of which are hereby incorporated by reference in their entirety for all purposes.

TECHNICAL FIELD

The present disclosure relates to the field of remote network monitoring and control of the status of a movable barrier, more particularly to the initial determination of the open/close status of a garage door, and the subsequent wireless transmission, via the Internet, of such determined status to an Internet access device, and even more particularly, to the receipt and processing of a remotely generated change-of-door-status command, via the Internet, to move the garage door in compliance with such command.

BACKGROUND

Movable barriers, such as upward-acting sectional or single panel garage doors, residential and commercial rollup doors, and slidable and swingable gates, are used to alternatively allow and restrict entry to building structures and property. These barriers are driven between their respective open and closed positions by motors or other motion-imparting mechanisms, which are themselves controlled by barrier moving units, sometimes referred to as "movable barrier operators," and in the specific case of a door, as "door operators," and in the even more specific case of a garage door, as "garage door operators." Garage door operators are effective to cause the DC or AC motor, and accompanying motor drive assembly, to move the associated garage door in accordance with the instructions from the garage door operator.

Each garage door operator includes a door controller (typically, a microprocessor, microcontroller, or other programmable platform) for processing incoming door commands and generating output control signals to the motor which, in combination with its associated drive assembly, moves the garage door in accordance with the incoming door commands. The incoming door commands have typically been in the form of wired or wireless signals transmitted from interior or exterior wall consoles, or from hand held or vehicle mounted RF transmitters in physical proximity to the garage door operator.

However, with the near ubiquity of the Internet and the proliferation of electronic devices and equipment designed to access the Internet, such as personal computers, cellphones, and Smartphones, systems are currently being designed and implemented in the trade that enable non-proximate, or remote, monitoring of door status, via networks, including the Internet. For example, if a homeowner is away from its residence, and wants to determine whether the garage door the homeowner had intended to close, did in fact close, or whether the garage door it intended to leave open for a workman to enter, had in fact been left open, using one of these systems, the homeowner can remotely monitor the status of the garage door (e.g., whether it is open or closed). Moreover, if the garage door is not in the desired position, these systems are designed to also enable the homeowner, from a remote location, to transmit change-of-door status commands, including over the Internet, to control the movement of the garage door to the desired position, all without having to be physically proximate the garage to do so. For purposes of this description, and the appended claims, the terms "remote" and "remotely", when referring to either the monitoring of door status, or transmitting a change-of-door status command, are to be construed as carrying out such activity other than from a location in proximity to the movable barrier operator and/or involving unattended barrier movement.

These aforestated garage door systems thus typically use means capable of determining the "open" or "closed" status of the garage door that is then transmitted to the remotely located homeowner. For example, some of these systems use door status monitoring apparatus affixed to, or proximate, the garage door to directly monitor the garage door status. While this approach is generally acceptable for many applications, the requirement to have separate apparatus affixed to, or proximate, the garage door may, for various reasons, not be the most desired approach. Others have proposed deriving door status directly from the programmable door controller of the garage door operator (i.e., the microprocessor, microcontroller or other programmable platform controller of the garage door opener). However, this approach has not been entirely acceptable for all conditions of service.

It is therefore among the objectives of the embodiments of the remote door status monitoring and control system herein to provide a new and improved version of a remote door status monitoring and control system that is more reliable, offers new advantages of Internet or other network signal transmission, is convenient to install and use, and provides advantages over other existing systems.

SUMMARY

A new and improved remote movable barrier monitoring and control system is configured to interconnect with movable barrier (e.g., garage door) operator apparatus adapted to control the operation of a motor (or other motion imparting mechanism.) The door status monitoring portion of the system is configured to ultimately derive "open" or "closed" door status from the motor as it drives the garage door between alternate garage door positions. Specifically, an encoder operatively associated or integrated with the motor is operable to initially generate a stream of motor signal pulses indicative of motor movement (e.g., direction of motor output shaft rotation), and thus indicative of the direction of movement of the garage door. Programmably controlled apparatus, operatively coupled to the encoder, subsequently receives and processes the incoming pulse stream of motor signal pulses, according to its programmed instructions, generating digital door status signals respectively indicative of either the "open" or "closed" garage door status position. The generated garage door status position is derived from, and corresponds to, predetermined counts of the motor signal pulses of the pulse stream. A wireless transceiver of the system is adapted to wirelessly transmit the "open" or "closed" status door position, via the Internet network, to remotely disposed Internet access apparatus.

In accordance with one of the unique features of the present system, the generated pulse stream of motor signal pulses from the encoder is also routed to the door controller of the garage door operator and is effective to also provide additional supervisory control over the movement of the motor, and therefore the movement of the garage door.

Alternate embodiments may be used for the encoder that generates the stream of motor signal pulses. For example, an encoder may have one or more pulse generators to generate the stream of motor signal pulses. In the case of multiple pulse generators, a first pulse generator is operable to generate motor signal pulses indicative of at least one of a speed and a distance of movement of the door, while the combination of the first pulse generator and the second pulse generator is operable to generate motor signal pulses indicative of direction of movement.

The encoder may generate the pulses based on movement of a wheel, the wheel having spaced paddles projecting therefrom with spaces defined between the paddles, the wheel affixed to a rotatable output shaft of the motor for rotation therewith. For example, the width of each spaced paddle may be identical to the width of the space defined between the paddles. Additionally, the wheel may include a dissimilar spaced paddle projecting therefrom and providing a registration tab comprising a different width. Motor signal pulses corresponding to passage of the spaced paddles past the encoder are therefore different than a motor signal pulse corresponding to passage of the registration tab past the encoder.

The new and improved system is also adapted to receive and process remotely generated change-of-door status commands, the received change-of-door status commands processed by the programmably-controlled apparatus of the door control module to initially initiate an unattended door warning alarm followed, after a predetermined delay, with a pulse to initiate door operation by the garage door operator in accordance with the change-of-door status command.

Additional features, aspects, and objectives of the disclosed embodiments of the new and improved remote monitoring and control system and method will become readily apparent to those skilled in the art from the hereinafter detailed description, read in conjunction with the following drawings.

DETAILED DESCRIPTION

Embodiments of the remote movable barrier status monitoring and control system in accordance with the principles of the present invention, as defined solely by the appended claims, will be described below. These described embodiments are only non-limiting examples of implementations of the invention as defined solely by the attached claims. Additionally, in an effort to provide a focus of the description of important features of the disclosed embodiments emphasizing the principles of the present invention, some details that may be incorporated, or may prefer to be incorporated, in a commercial implementation of the herein described system, but are not necessary for an understanding of the invention by one skilled in the art, have been omitted in order to highlight the important features relevant to an understanding of the invention. Also, the accompanying drawing figures are not necessarily to scale and certain elements may be shown in generalized, schematic or block diagram format in the interest of clarity and conciseness.

Figure 1:
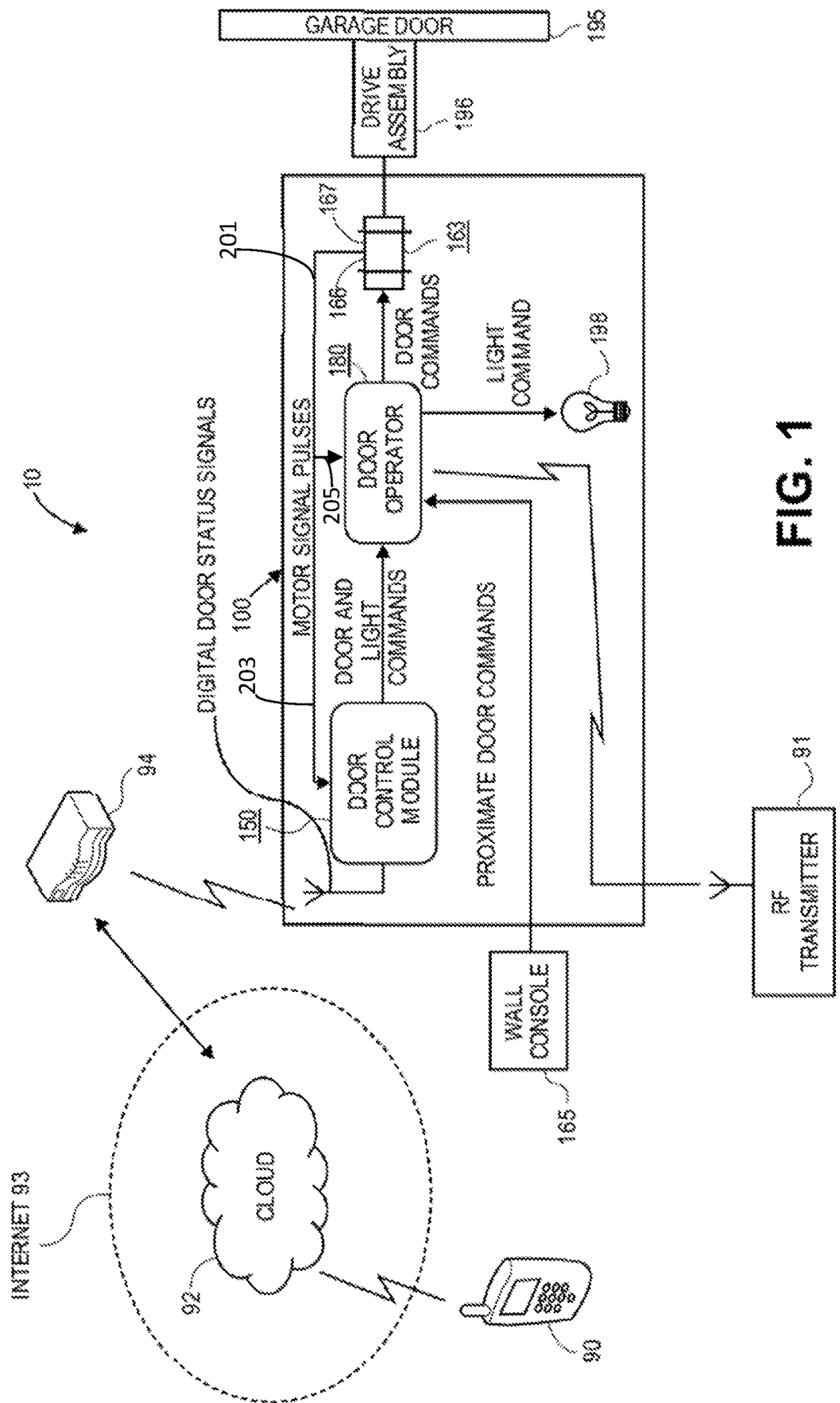
FIG. 1 is a block diagram of an embodiment of the interconnection of the principal components of a remote movable barrier status monitoring and control system in accordance with the principles of the present invention.

With initial reference now to FIG. 1, there is depicted a block diagram of the interconnection of the principal components of a new and improved remote garage door status monitoring and control system 10, incorporating the principles of the present invention. Accordingly, the system 10 enables remote monitoring of the status [e.g., "closed" or "not closed" (i.e., "open")] of the garage door 195 as well as enabling remotely transmitted change of such door status. Specifically, the system 10 includes a power head chassis 100 that encloses motor assembly 163, garage door operator 180, and door control module 150. The motor assembly 163 includes (i) a motor 167 adapted to move the garage door between its open and closed positions in the conventional manner known by one of ordinary skill in the industry, and (ii) an encoder 166 associated and/or integrated with the motor 167 for generating a stream 201 of motor signal pulses indicative of movement of the motor 167, (e.g., direction of rotation of the output shaft of motor 167) and therefore indicative of the direction of travel of the garage door 195.

The motor 167 is operatively coupled to a conventional drive assembly 196, the motor 167 and drive assembly 196 effective to impart movement to the door 195 in accordance with door commands remotely and/or proximately transmitted to garage door operator 180 and thereafter to motor 167.

The drive assembly 196 may be any of the standard and conventional drive assemblies available on the market that are suitable to move the garage door 195 in response to motor 167.

Figure 2A:
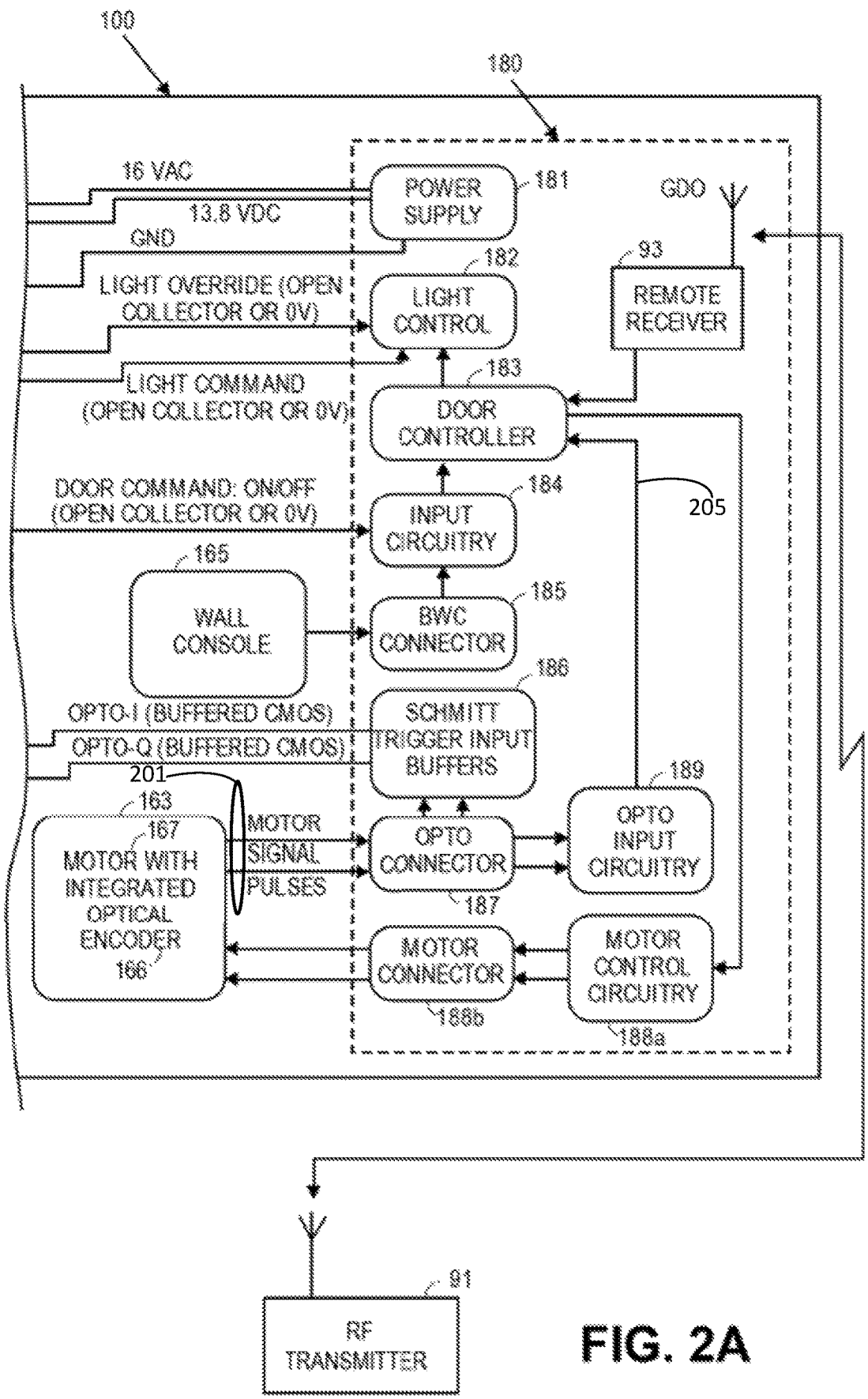
FIGS. 2A and 2B each respectively show a portion of a more detailed schematic block diagram of the remote movable barrier status monitoring and control system of FIG. 1.
Figure 2B:
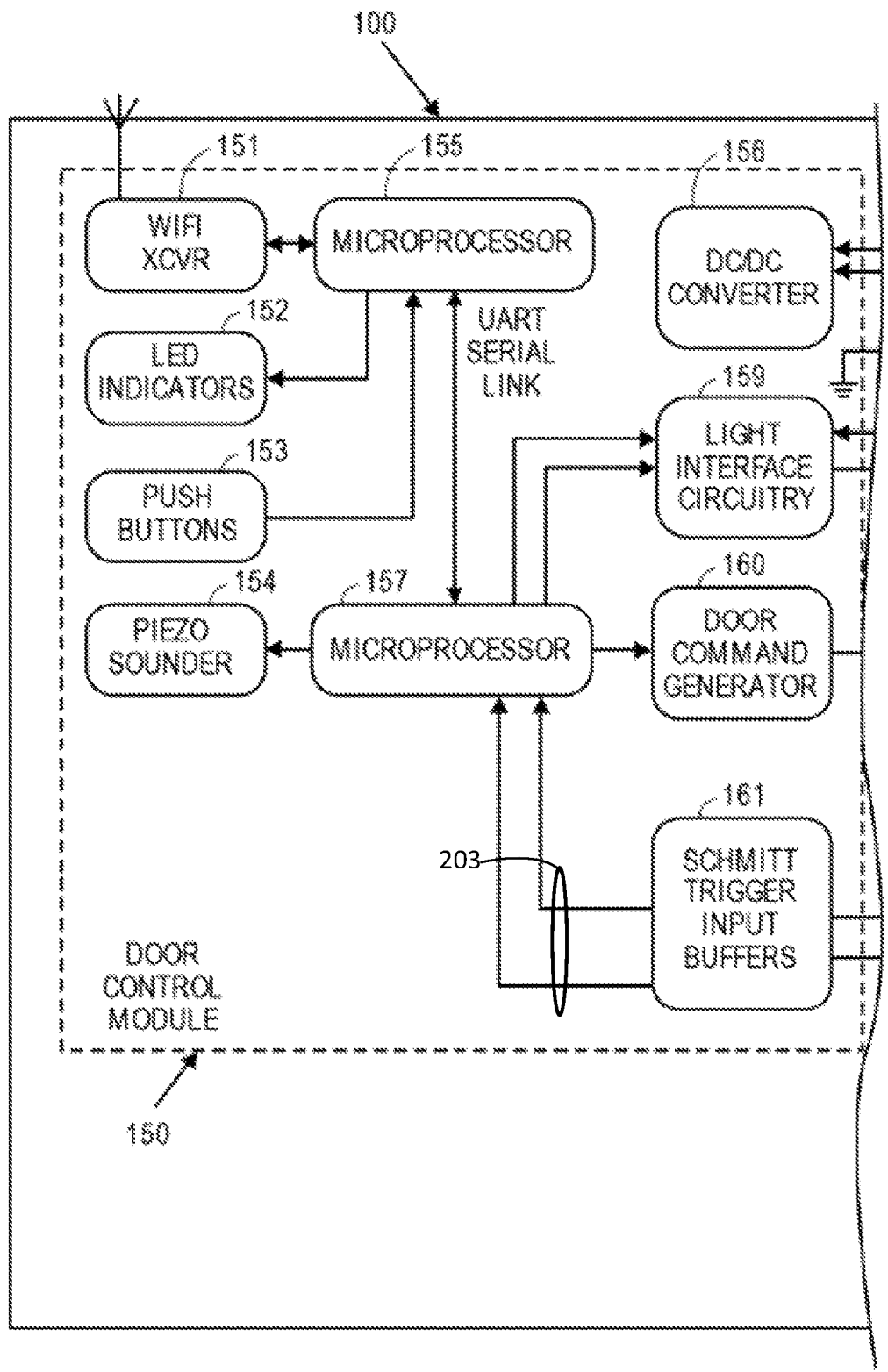
Figure 3:
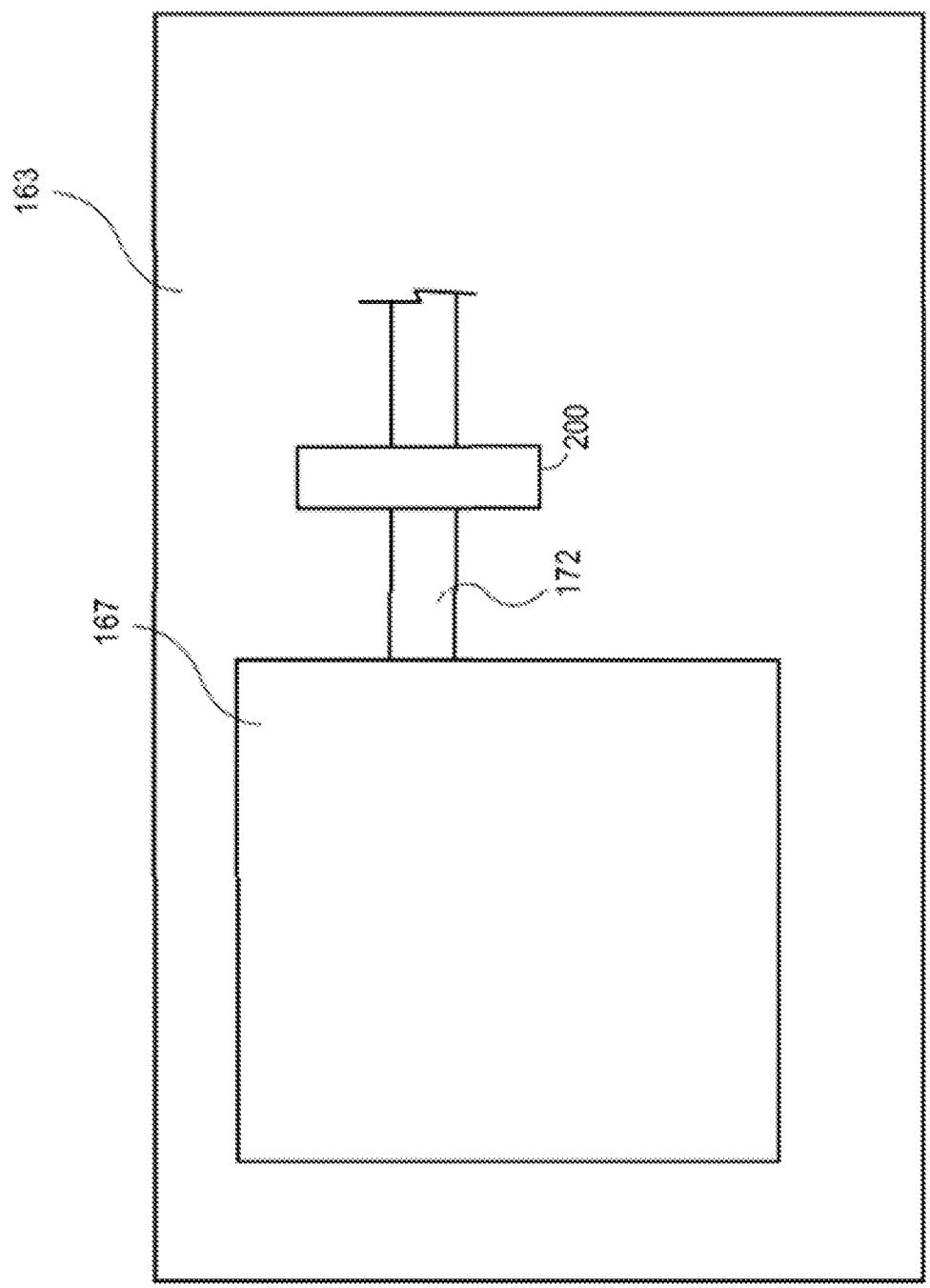
FIG. 3 is a schematic diagram of a motor pulse encoder responsive to the movement of the rotatable output shaft of a garage door motor adapted to move the garage door.
Figure 8:
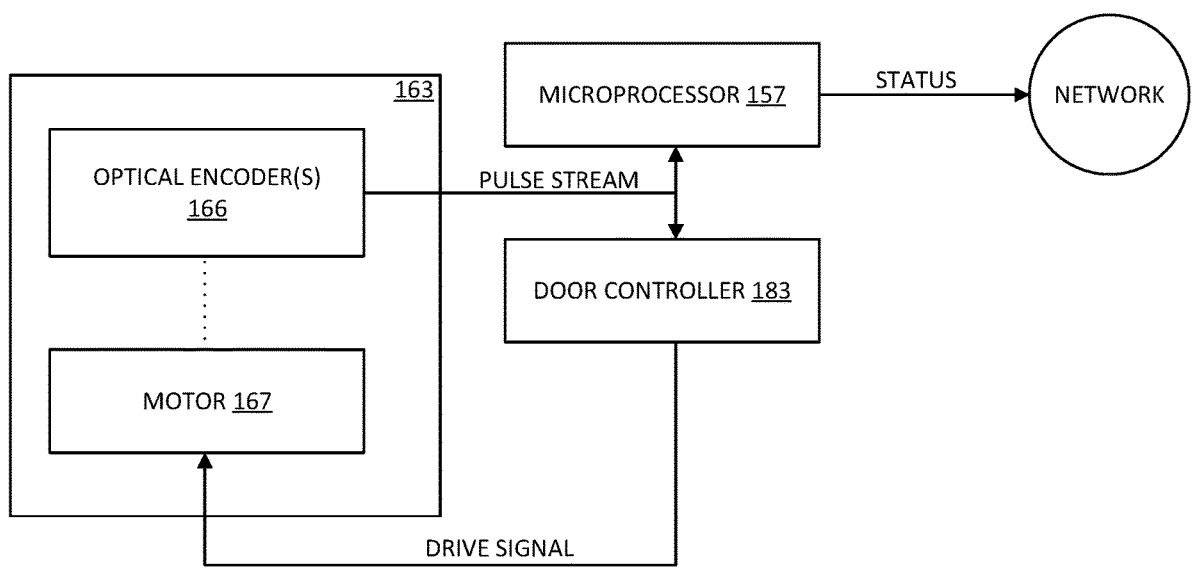
FIG. 8 shows further aspects of a more detailed schematic block diagram of the remote movable barrier status monitoring and control system of FIG. 1.

In accordance with the overall operation of the garage door status monitoring and control system 10, and with reference to FIGS. 2A, 2B and 8, the stream of motor signal pulses 201 are conductively transmitted, via path 203 (for example, by wire) to the door control module 150 and, via path 205 (for example, by wire) to the door controller 183 of the garage door operator 180. This motor signal pulse stream 201 may initially be in the form, for example, of optical pulses, and then converted to electrical motor signal pulses, inputted to door control module 150 and to the door controller 183 of garage door operator 180.

The door control module 150 is effective to process and convert the incoming motor signal pulse stream to digital door status signals indicative of the garage door status, for example "closed/open" or "closed/not closed" status, of the garage door 195. This door status information is then wirelessly transmitted by the door control module 150, via a WiFi home router 94, to (and for storage in) cloud server 92 of the Internet 93, where such status information is subsequently pushed to a Smartphone 90, or any other suitable Internet access device, such as a desktop or laptop computer, personal data assistant (PDA), mobile phone, tablet, or the like, for user monitoring of the then current garage door status. It is emphasized that in this embodiment of system 10, door status is not requested, the door status information preferentially being "pushed" to the next component or stage.

With continuing reference to FIG. 1, the system 10 is also effective to receive and process change-of-door-status commands remotely initiated from Smartphone 90, via the Internet and cloud server 92, and home router 94, and wirelessly transmitted back to the door control module 150. Change-of-door-status commands may also be initiated from the Cloud server 92 in appropriate situations, such as a pre-programmed time-to-close, or other pre-programmed activities.

Upon receipt of the remotely generated change-of-door-status command, door control module 150 is effective to transmit a pulse initiating the unattended warning alarm, and thereafter after a predetermined delay, initiate garage door operator door controller 183 (FIG. 2A) to carry out the change-of-door-status command. In accordance with conventional procedure, user-generated door toggle open/close commands may also be transmitted to the door operator 180 from wall console 165, which, as conventionally known, turns on the worklight 198 simultaneously with the operation of the motor 167. One or more hand-held or vehicle-mounted RF transmitters 91 proximate to the garage door 195 may also transmit door commands to the door operator 180 in similar manner as wall console 165.

Referring now to FIGS. 2A, 2B, and 8, there is depicted a detailed schematic block diagram of a preferred embodiment of the garage door monitoring and control system 10 located within power head chassis 100. For clarity of presentation, the detailed schematic block diagram has been broken into two adjacent portions, namely FIG. 2A depicting, at the right side of the block diagram, the components of the garage door operator (GDO) 180, and FIG. 2B depicting, at the left side of the block diagram, the components of the door control module 150. In addition, FIG. 8 emphasizes aspects of the relationship between the microprocessor 157 and the door controller 183, both of which receive the pulse stream 201 of motor signal pulses from the encoder 166. As illustrated in FIG. 8, the microprocessor 157, which has received the pulse stream 201 from the encoder 166 determines therefrom the status of the movable barrier and provides this status ("open" or "closed"), via transceiver 151, to a network, such as the Internet. The door controller 183, which has also received the pulse stream 201 from the encoder 166, provides a control signal (also called, "drive signal") to the motor 167 of the motor assembly 163, as described in further detail herein. Thus, the combination of the encoder 166 and the microprocessor 157 determines the open/closed status of the door, without need of sensors directly or proximately attached to the movable barrier and without the inconvenience and disadvantage of attempting to derive door status from the door controller 183.

Referring initially to FIG. 2A, the motor assembly 163 includes (i) a motor 167, which in this embodiment is a DC motor, and (ii) an encoder 166 integrated with motor 167. While the encoder 166 may be of any design effective to generate the stream of motor signal pulses indicative, for example, of the direction of rotation of the output shaft of motor 167, and therefore the direction of travel of the garage door 195, one preferred embodiment of an encoder is a rotary optical encoder that produces a dual set of electrical output pulses in respective in-phase and quadrature format, and is subsequently described in greater detail in connection with FIGS. 3-7.

As illustrated in FIG. 2A, the encoder 166 generates a dual set of electrical motor signal pulses, the optical pulses initially generated by the encoder having been converted to electrical pulses by a phototransistor (not shown) forming part of the assembly of encoder 166. (As such, both the optical pulses and the electrical pulses are merely differing formats of the stream of motor signal pulses referenced in FIG. 1.)

The electrical pulses are subsequently routed via opto connector 187 (which connects the encoder 166 with the GDO board) to and through input buffers 186 and, in turn, as electrical pulses Opto I and Opto-Q, are routed through input buffers 161 of door control module 150 (FIG. 2B). The dual set of electrical pulses are also routed via opto connector 187 to opto input circuitry 189, and thereafter to the door controller 183 where, among other functions, travel limits for the garage door 195 are maintained.

With continuing reference to FIGS. 2B and 8, the buffered stream of electrical pulses from input buffers 161 are routed to microprocessor 157. In accordance with the technique subsequently described, these electrical pulses are then processed, preferably by programmable-controlled operation, by microprocessor 157 (or other programmable platform) to produce digital door status signals indicative of the status of the garage door 195 (e.g., "open" or closed" or "closed" or "not closed"), the details of which are subsequently described. The so-generated digital door status signals are then transmitted from microprocessor 157, by way of UART serial link, to microprocessor 157 (in direction of upwardly pointed arrow) for storage and WiFi conditioning, and thereafter to transceiver 151, where the WiFi door status information is subsequently wirelessly transmitted, as previously described, via the Internet, to the Cloud server 92, which thereafter transmits such information to Smartphone 90 (FIG. 1).

The transceiver 151 of door control module 150 is effective to receive any remotely generated change-of-door-status command, such command then routed to microprocessor 155. After the change-of-door-status command is compared with the door status information previously stored in microprocessor 155, to assure that the change-of-door-status made the subject of the incoming command is not the same as the previously stored status, the incoming change-of-door-status command is then routed by microprocessor 155 (in direction of downwardly pointed arrow) to microprocessor 157.

The microprocessor 157 then routes the change-of-door-status command, via the door command generator 160 of the door control module 150, and via the input circuitry 184 of the garage door operator 180 (FIG. 2A), to produce a signal pulse to activate the door controller 183 of garage door operator 180. The programmably-controlled door controller 183 then, via motor controller circuitry 188a and motor connector 188b, instructs the motor 167 to move the garage door in compliance with the change-of-door-status command.

In various embodiments, prior to the microprocessor 157 routing the change-of-door-status command to the door controller 183, the microprocessor 157 activates the piezo sounder 154 and light interface circuitry 159 to respectively sound the on board buzzer and flash the worklight 198, to warn anyone near the garage door of the imminent unattended movement of the garage door 195. Thus, when the microprocessor 157 receives the command to move the door 195, an annunciation period begins, during which the piezo sounder 154 and flashing light 198 are activated at the rate and duration in compliance with UL325 requirements. After this annunciation period has expired, the microprocessor 157 then transmits the pulse to activate the door controller to carry out the change-of-door-status command.

While the embodiment disclosed in FIG. 2B utilizes two microprocessors 157 and 155, it is to be understood that the functions performed by each microprocessor may also effectively be consolidated in a single microprocessor.

The door controller 183 also receives the motor signal pulses, as illustrated in FIGS. 2A and 8. In that regard, and discussed in greater detail hereinafter, the door controller 183 may adjust the velocity of a moving garage door, may stop movement of the moving garage door, may reverse movement of the moving garage door, and/or may adjust a drive signal provided to the motor based on the stream of motor signal pulses. For instance, motor signal pulses may be counted by the door controller 183. A count of motor signal pulses indicating that a garage door has not yet reached a closed position may cause the door controller 183 to continue driving the motor 167, whereas a count of motor signal pulses indicating that the garage door has reached the closed position may cause the door controller 183 to suspend driving the motor 167. Such processing can be executed by programmable software executed by the door controller 183.

In accordance with the preferred embodiment of the rotary optical encoder 166, reference now is to FIGS. 3-7 of the drawings. Accordingly, this embodiment of rotary optical encoder 166 is comprised principally of (i) a wheel 200 affixed to the rotatable shaft 172 of the motor 167 (FIGS. 3 & 7), (ii) dual angularly spaced optical pulse generators 168 and 169 (FIG. 7), with respect to which wheel 200 rotates in conjunction with the rotation of the output shaft of motor 167, generating optical pulses indicative of the extent and direction of rotation of the output shaft, and (iii) a phototransistor converting the optical pulses to electrical pulses.

Figure 4:
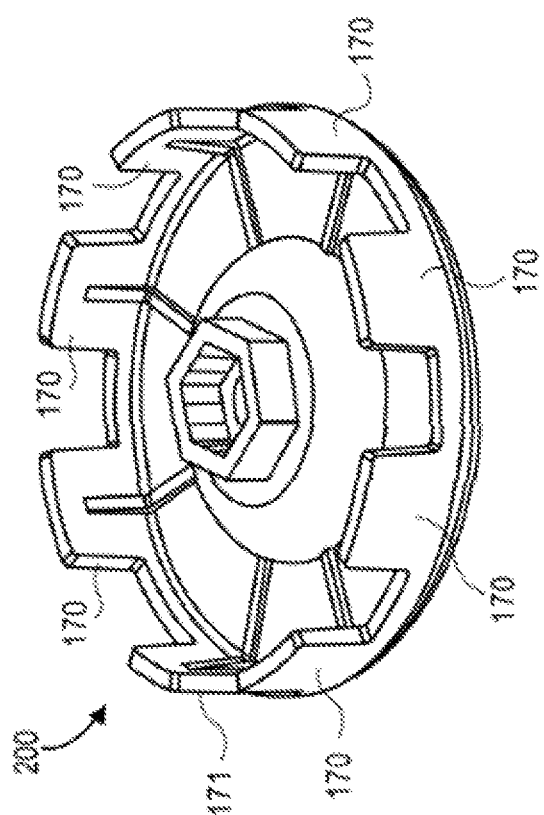
FIG. 4 is a perspective view of the gapped wheel portion of a preferred embodiment of a rotary optical encoder providing the function of the motor pulse encoder of FIG. 3.
Figure 5:
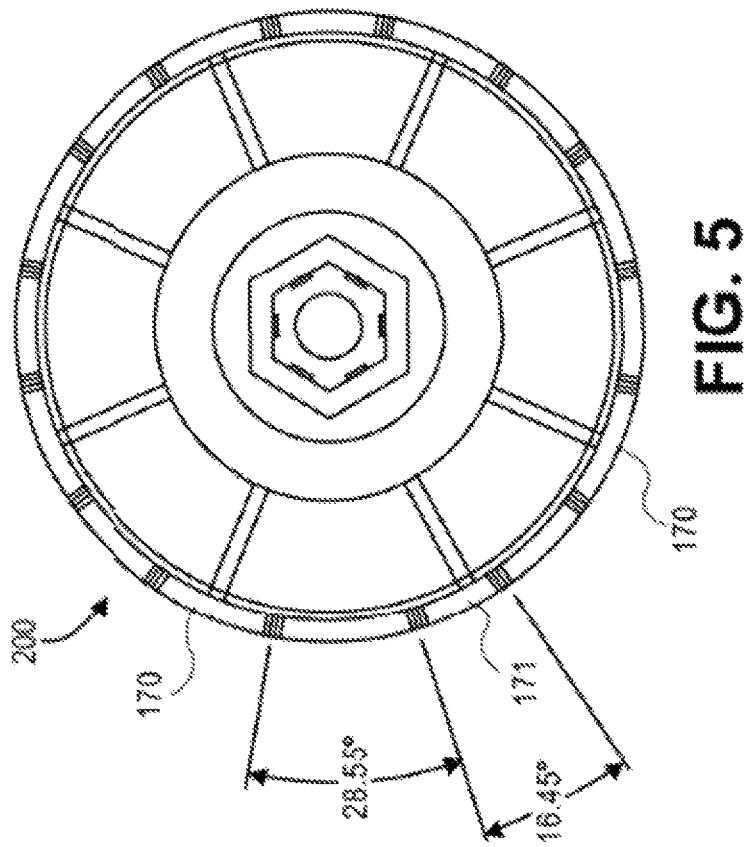
FIG. 5 is a front view of the wheel of FIG. 4.
Figure 7:
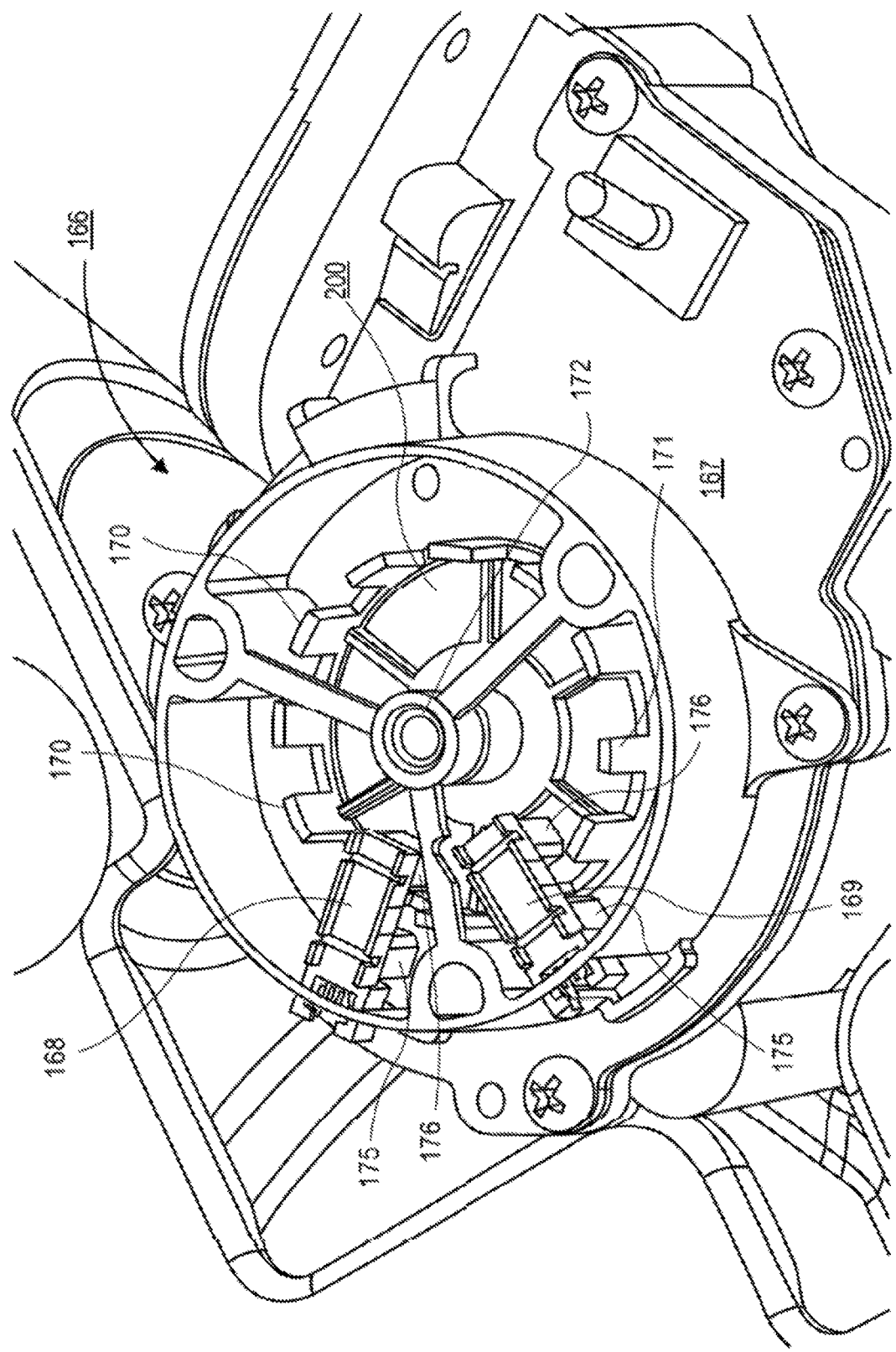
FIG. 7 is a perspective view of the mounting and interaction of the gapped wheel illustrated in FIGS. 4-6 with respective optical pulse generators of the rotary optical encoder.

As best illustrated in FIGS. 4 & 7, wheel 200 has a plurality of upwardly extending, spaced apart, and identically dimensioned paddles 170. Notably, wheel 200 also has a single, upwardly extending, paddle 171 (also called a "registration tab" 171), of a differential (e.g., narrower) size or dimension than that of paddles 170. As shown in FIG. 4, the paddles 170 are arranged in an annular, castellated type, array. The two optical pulse generators 168 and 169 each include a light transmitter 176 and a light receiver 175. The light transmitters of optical pulse generators 168 and 169 are positioned to direct light rays at the light receivers of optical pulse generators 168 and 169. However, when the wheel rotates as a consequence of motor shaft rotation, the spaced paddles interrupt the light rays, and generate optical pulses, in accordance with a pattern defined by the pattern of the paddles and the spaces therebetween.

Thus, the identically sized and spaced paddles 170 provide for the generation of evenly spaced optical pulses of the same pulse length, with the paddle 171 (also called a "registration tab" 171) providing a light pulse after a shorter interval. While the spacing between paddles may be in accordance with whatever output is desired, in the preferred embodiment shown (and best illustrated in FIG. 5), the angular spacing between adjacent paddles 170 is approximately 16.45°, with the spacing between paddle 171 (registration tab) and an adjacent paddle 170 being approximately 28.55° due to the narrower size of the paddle 171. The result of having a narrower sized paddle 171 is that one reference pulse is generated for a given number of equally spaced typical pulses 170. In the illustrated embodiment, this would be 15 spaced pulses between paddles 171, and one additional reference pulse for each full rotation of the wheel 200. In various instances, this would be 14 spaced pulses and two additional reference pulses caused by registration tab 171 for each full rotation of the wheel 200. In this manner, the microprocessor 157 and the door controller 183 may be provided with pulses to count in order to determine a distance of travel of the garage door, and may time the periodic arrival of the pulses in order to determine a speed of movement of the garage door. Moreover, the comparison of pulses arriving from the optical pulse generator 168 and from the optical pulse generator 169 may provide direction of rotation data, and the periodic incidence of a pulse corresponding to the registration tab 171 may provide for error correction in order to minimize effects of missed pulses within the period of rotation of the wheel 200 by providing a unique reference pulse for each revolution of the wheel 200.

Figure 6:
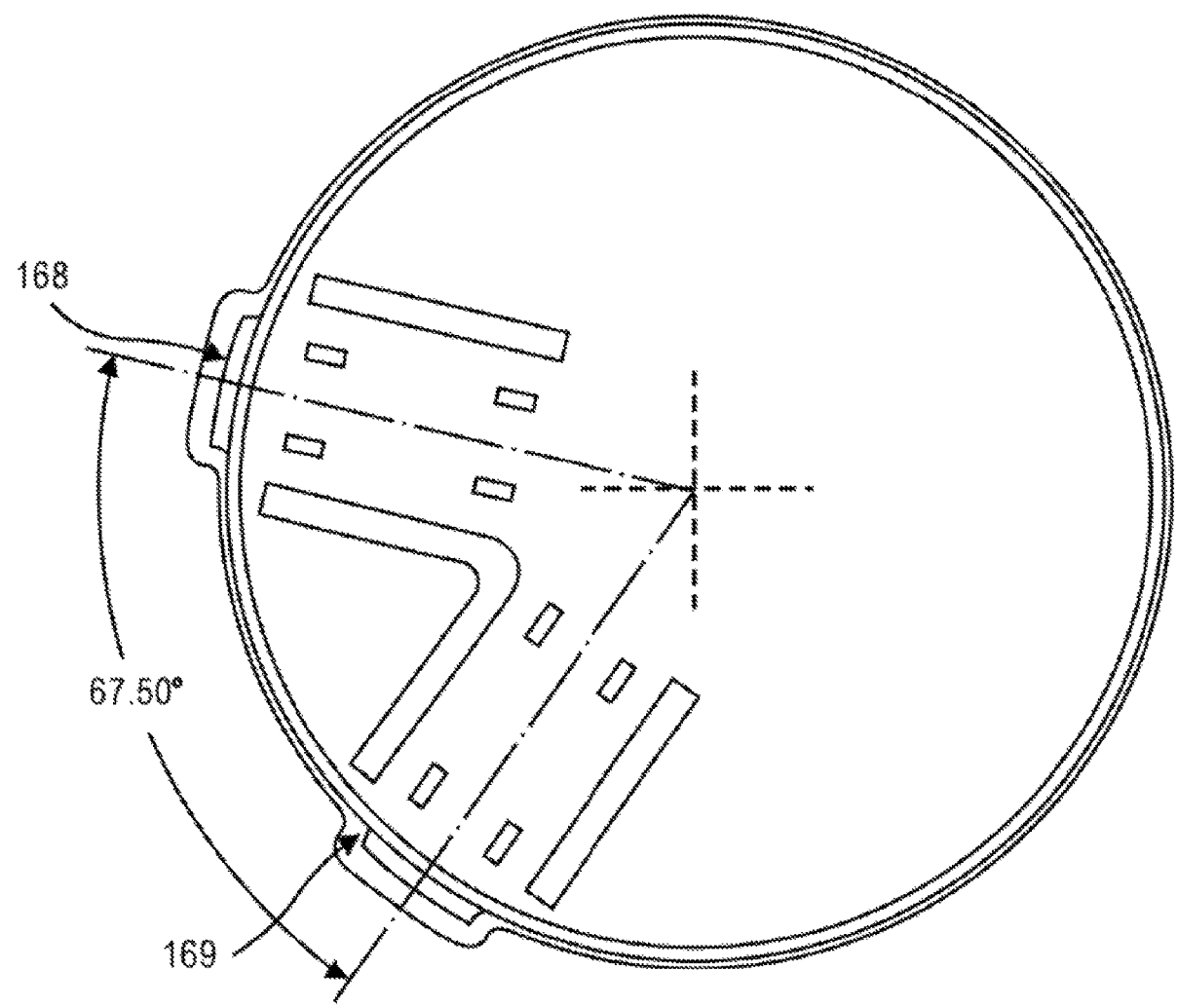
FIG. 6 is a top view of the cover of the wheel of FIG. 4.

As best illustrated in FIG. 6, the optical pulse generators 168 and 169 are preferably angularly spaced from one another by 67.50°. This spacing, and the angular spacing between the paddles 170 and 171, are so designed that when the wheel 200 rotates in a first direction, both the pulse generator 168 and the pulse generator 169 simultaneously generate a first optical pulse pattern. Thus, a first pattern of optical pulses is generated by pulse generators 168-169 when the motor shaft is rotating in, say, a clockwise direction, while a second pattern of optical pulses are generated by pulse generators 168-169 when rotating in a counterclockwise direction. In this manner, direction of rotation may be determined so that it may be determined whether the garage door is moving upward or moving downward. Moreover, an accurate count of pulses indexed to the upper travel limit of the garage door may be maintained by the microprocessor 157 and/or the door controller 183, to permit determination of whether the door is closed or open.

The processing of the motor signal pulses from the encoder 166 may be in accordance with programmable software executed by microprocessor 157, and further programmable software executed by door controller 183. For example, the processing algorithms of such software may be directed to reliably performing the task of determining the location of the close limit and tracking position to determine when the garage door is in sufficient proximity to that close limit to declare the door as being "closed." All other detected positions of the door may then be declared as "not closed", or "open." Thus, the microprocessor 157, under control of the algorithm of the software, may infer, from the motor signal pulse inputs, that it has run in one direction for a predetermined minimum time and then stopped, that the door is away from the other limit. Therefore, if the door runs upwardly and then stops, the determination is that it is not at the close limit. Another algorithm may then be used to confirm that finding. Thus, microprocessor 157, under control of that algorithm, may record that the minimum and maximum positions that are detected are the working limits.

Thus, in accordance with the monitoring aspect of the system 10 that determines the existing door status, the microprocessor 157 interprets the motor signal pulses (i.e., the electrical pulses routed from the input buffers 161 when using a rotary optical encoder) in order to determine the status of the barrier 195. For example, if the first pattern of motor signal pulses is generated (as a consequence of the clockwise rotation of the motor shaft), then the microprocessor 157 interprets the incoming electrical pulses to indicate that the door 195 has moved in the open direction. If the second pattern of motor signal pulses are generated (as a consequence of the counterclockwise rotation of the motor shaft), then the microprocessor 157 interprets the incoming electrical pulses to indicate that the door 195 has moved in the closed direction. In addition, the door controller 183 may interpret the motor signal pulses in order to control the motor 167 driving the barrier 195 and may change the drive signal to the motor 167 based on the behavior of the motor 167. This is possible because the behavior of the motor 167 is reflected by the motor signal pulses.

In summary, the microprocessor 157 and/or the door controller 183 may be programmed to use a variety of methods to determine whether the door 195 is closed or not closed, or closed or open. Thus, in accordance with programming of one method, or algorithm, if the pattern of electrical pulses includes at least a predetermined threshold number of pulses, the microprocessor 157 and/or the door controller 183 may then interpret the door 195 to be "closed." Conversely, if the pattern of electrical pulses includes less than the predetermined threshold number of pulses, the microprocessor 157 and/or the door controller 183 interprets the barrier to be not closed or open. The microprocessor 157 and the door controller 183 may have a different predetermined threshold number of pulses.

Moreover, with respect to the microprocessor 157, the threshold number of pulses may evolve over time to accommodate real-world practicalities of an operating environment of a door 195. For instance, a door 195 may be determined to be closed if it is within four pulses of a threshold number of pulses associated with a closed status. Over multiple closure cycles, a door 195 may cease moving after a number of pulses progressively farther from the initial threshold number of pulses. Over time, the microprocessor 157 may change the threshold number of pulses corresponding to a closed status. In this manner, the microprocessor 157 may also be responsive to changes by a user of the end point of travel of the door 195. For instance, a user may adjust the door controller 183 to set a different closed position. After a plurality of open and closed cycles, the microprocessor 157 may recognize that the door 195 ceases movement after a number of pulses different than previously and may change the threshold number of pulses corresponding to a closed status.

Door controller 183 may use the presence or absence of the electrical pulses to verify proper operation. For example, if pulses are not received at the anticipated intervals, then an error has occurred that may mean that the door 195 is stuck. In accordance with a feature of some embodiments of system 10, if errors are detected, the barrier opener system 10 may stop the door 195 or cause it to stop and reverse direction of travel.

With reference now to FIGS. 2A-B, 8, and 10, aspects of the microprocessor 157 are discussed in further detail. As mentioned, the microprocessor 157 is a programmably-controlled apparatus that includes a variety of logical modules corresponding to different operations and interconnected by a logical bus 1021. For instance, the microprocessor 157 may include a pulse stream receiver 1001. The pulse stream receiver 1001 may comprise an input port of the microprocessor 157 configured to receive a pulse stream. The pulse stream may be a set of motor signal pulses indicative of at least one of a speed, distance, and direction of movement of the motor operable to move the door 195. This pulse stream may be generated by the optical encoder 166. In various instances, one pulse generator 168 or 169 provides the pulse stream associated with the pulse count captured by the pulse counter 1007 (discussed below), and both pulse generators 168 and 169 provide the pulse stream associated with the direction determination of the direction classifier 1005.

The microprocessor 157 also may include a pulse detector 1003. A pulse detector 1003 processes the pulse stream and identifies the pulses therein. In various embodiments, the pulse detector 1003 determines whether the pulse is a low-to-high pulse or a high-to-low pulse. In various embodiments, the pulse detector 1003 determines the period and duty cycle of one or more pulse of the pulse stream, such as to distinguish pulses caused by the registration tab. The pulse detector 1003 may compare the pulses from pulse generator 168 and pulse generator 169. The pulse detector 1003 is operatively coupled, via a logical bus 1021, to a direction classifier 1005, a pulse counter 1007, and a pulse count error correction module 1009, as well as to a speed detector 1013, among other modules.

The direction classifier 1005 determines, based on the relative pulse period and duty cycle and/or a comparison of pulses from pulse generator 168 to pulses from pulse generator 169, the direction in which the door is moving.

The pulse counter 1007 maintains an index that corresponds to a count of received pulses, indexed to an end point of travel of the door. In various embodiments, the pulse counter 1007 is indexed relative to an upper movement limit of the door. The pulse counter 1007 increments in response to each pulse detected by the pulse detector 1003 while the direction classifier 1005 indicates that the door is moving downwardly. The pulse counter 1007 decrements in response to each pulse detected by the pulse detector 1003 while the direction classifier 1005 indicates that the door is moving upwardly. In this manner, the pulse counter 1007 maintains a counter that accurately corresponds to an instantaneous position of the door.

The pulse count error correction module 1009 receives an indication from the pulse detector 1003 of the receipt of a pulse corresponding to the registration tab. The pulse count error correction module 1009 maintains a tally of pulses received between pulses corresponding to the registration tab. If the tally of pulses between registration tabs is inaccurate, the pulse count error correction module 1009 adds or subtracts an appropriate number of pulses from the counter maintained by the pulse counter 1007 based on the known number of tabs on the wheel 200 extant between the registration tabs.

The microprocessor 157 also includes an end point determination module 1011. The end point determination module 1011 compares the counter maintained by the pulse counter 1007 to a predetermined threshold number of pulses that corresponds to an arrival of the door at a position corresponding to a closed status. The end point determination module 1011 may also utilize indications that the door is slowing, provided by the speed detector 1013, to improve the accuracy of such a determination. In response to the end point determination module 1011 determining that a garage door has a closed status, the end point determination module 1011 instructs a status indicator 1019 to transmit this status to other system aspects as detailed elsewhere herein.

The microprocessor 157 may include a speed detector 1013. A speed detector 1013 may monitor the period between pulses detected by the pulse detector 1003 to determine a velocity of movement of a garage door. For instance, a garage door opener 180 may be configured to slow the travel of a garage door near a travel endpoint. The slowing or accelerating of the garage door changes the period between pulses. Thus, a slowing garage door may be associated with an increasing period between pulses detectable by the speed detector 1013. Such slowing provides a precursor indication that a door is reaching a closed position, thereby further ameliorating the potential for erroneous detection of closed and open states.

Moreover, the speed detector 1013 may monitor the period between pulses detected by the pulse detector 1003 to determine a velocity of movement of a garage door and may instruct a status indicator 1019 to transmit this status to other system aspects herein.

Finally, the microprocessor 157 includes an end point storage array 1017. The end point storage array 1017 stores past counts of pulses corresponding to the arrival of the door at a position corresponding to the closed status. The detected slowing of pulses detected by the speed detector 1013 may be stored in the end point storage array 1017, as well, and may be associated with different pulse counts along the range of travel of the door. By maintaining a record of past counts of pulses corresponding to an arrival of the door at a position corresponding to the closed status, the microprocessor 157 may determine if the closed point of the door is shifting over time. Specifically, the pulse counter 1007 may access the end point storage array 1017 and retrieve past counts of pulses corresponding to the arrival of the door at the position corresponding to the closed status and may update the predetermined count of pulses corresponding to the closed status as it changes over time. Moreover, the record of detected slowing of pulses may be accessed by the pulse counter 1007 in connection with further facilitating accurate determination of the count of pulses corresponding to the closed status.

Figure 9:
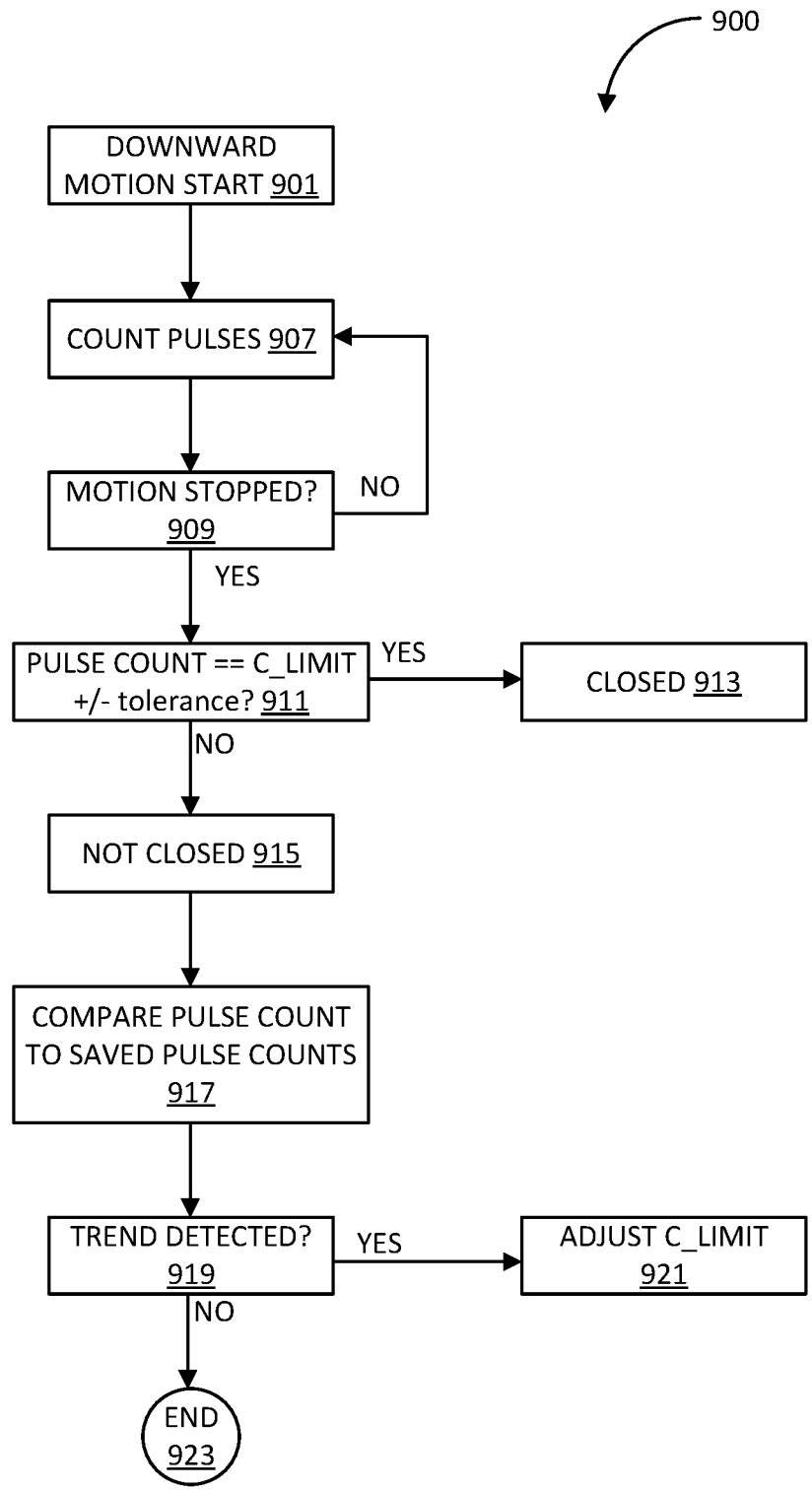
FIG. 9 shows a method of barrier closure monitoring performed by the microprocessor of the remote movable barrier status monitoring and control system of FIG. 1.
Figure 10:
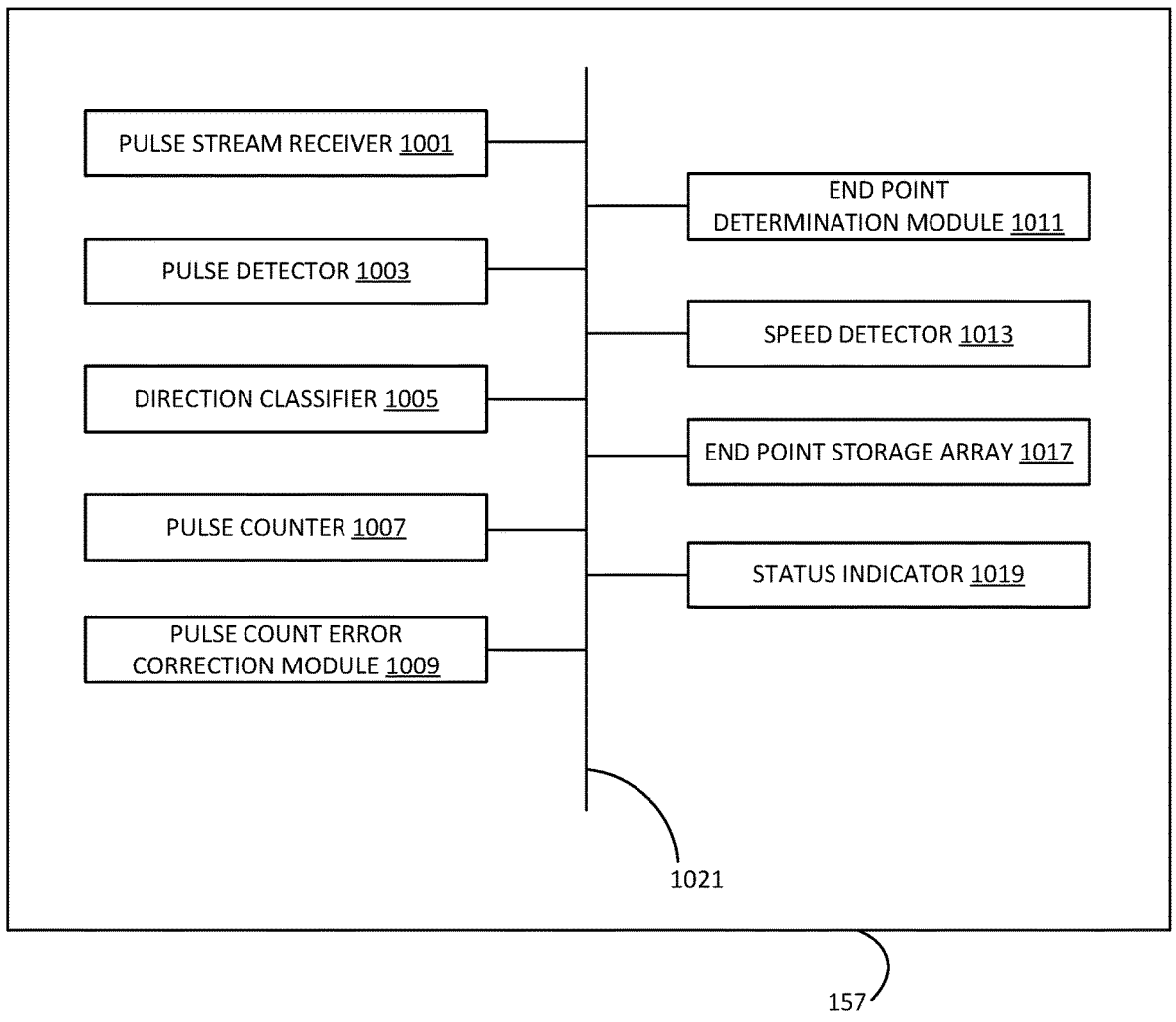
FIG. 10 shows aspects of the microprocessor, in accordance with various embodiments.

Having introduced aspects of the microprocessor 157, focus is extended from FIGS. 2A, 2B, and 8, to also include FIG. 9 for a discussion of a method of barrier closure monitoring 900. The method may include various steps. While the steps are provided in a sequence for ease of discussion, one may appreciate that the steps may occur in different order and/or may occur simultaneously or may overlap in time. A pulse stream receiver 1001 of a microprocessor 157 may begin receiving a pulse stream and a pulse detector 1003 of the microprocessor 157 may detect pulses in the pulse stream indicating that a closure motion has started (e.g., a door is moving). The direction classifier 1005 of the microprocessor 157 may determine the direction of movement of the door is a downward direction (block 901). The pulse counter 1007 of the microprocessor 157 begins counting pulses (block 907). The pulse detector 1003 of the microprocessor 157 determines whether the pulses continue or whether the pulses cease (corresponding to a motion stoppage of the door) (block 909). While the motion of the door is not stopped, the pulse counter 1007 continues to count pulses (block 907). In response to a stoppage of the motion of the door, the pulse detector 1003 causes the pulse counter 1007 to pass the number of pulses counted to an end point determination module 1011. The end point determination module 1011 compares the pulse count to a predetermined threshold number of pulses (C_LIMIT) (block 911). In various embodiments, the predetermined threshold number of pulses corresponds to a closed status of the door. Because variations may exist from closure operation to closure operation, the end point determination module 1011 may account for a tolerance, so that the pulse count may vary from the predetermined threshold number of pulses and still correspond to a closed status of the door. For instance, the tolerance may be plus or minus four pulses. In response to the pulse count falling within the tolerance range of the predetermined threshold number of pulses, the door is determined to be closed (block 913) and the status indicator 1019 transmits an appropriate status indication to other aspects of system. In response to the pulse count not falling within the tolerance range of the predetermined threshold number pulses, the pulse counter 1007 compares the pulse count to historical pulse counts associated with a closed status, provided in an end point storage array 1017 (block 917). In response to the pulse counter 1007 determining that a trend is detected (block 191), the pulse count associated with a closed status is adjusted (block 921). In response to no trend being detected, the method 900 ends (block 923). In this manner, the microprocessor 157 executes a method of barrier closure monitoring that both monitors barrier status to determine when the barrier is closed, but also evolves the determined pulse count associated with a closed status so that changes in operating conditions of the barrier may be accommodated.

Moreover, because the motor 167 moves under direction of the door controller 183, the door controller 183 may be caused to move the movable barrier to a different position associated with a closed status (for example, due to a change in the size of the opening of the garage door because an object such as a vehicle ramp is placed in the path of the garage door). Because it is desired for the microprocessor 157 to indicate accurate garage door status, this evolutionary algorithm may adapt to the door controller 183 moving the movable barrier to a different position by monitoring the pulse count associated with an end of travel of the door and comparing the pulse count to the end point storage array 1017 to determine whether the door did not fully travel to a closed position, or whether a new closed position has been adopted. Generally, pulse counts that outlie from those stored in the end point storage array 1017 indicate that the door did not fully travel to a closed position, whereas pulse counts that consistently correspond to a consistent new position different from those stored in the end point storage array 1017 may, over multiple closure cycles, replace those stored in the end point storage array 1017 and become the new predetermined count associated with the closed position.

Figure 14:
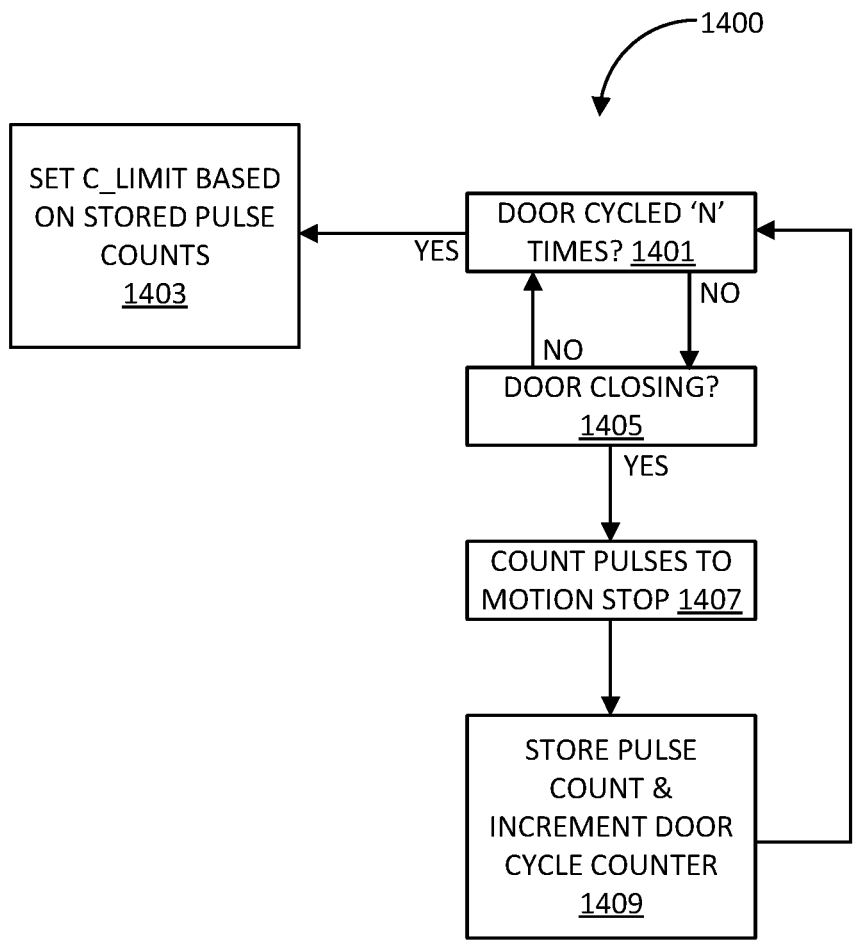
FIG. 14 shows a method of microprocessor end point calibration performed by the microprocessor of the remote movable barrier status monitoring and control system of FIG. 1.

The microprocessor 157 may also perform an initial calibration sequence. For instance, upon initial installation, or at the direction of a user, the microprocessor 157 may change the predetermined count associated with a closed position. For instance, FIG. 14 shows a method of microprocessor end point calibration 1400. In various embodiments, the microprocessor 157 determines whether the garage door has been cycled 'N' times, where N is a predetermined count (block 1401). For instance, the pulse counter 1007 may query the end point storage array 1017 to determine the number of cycles that have reached an endpoint. In response to the door having cycled N times, the predetermined count associated with a closed position is set based on the pulse counts stored in the end point storage array 1017 (block 1403). In response to the door having not cycled N times, the direction classifier 1005 determines whether the garage door is closing (block 1405). In response to the garage door closing, the pulse counter 1007 counts the pulses detected by the pulse detector 1003 until motion of the door stops (block 1407). In response to the garage door stopping, the pulse count is stored in the end point storage array 1017 and the index of the array is incremented so that a count of the number of door cycles is maintained for comparison to N (block 1409). The method of microprocessor end point calibration 1400 then returns to block 1401 to await a further cycle. In this manner, an array of N pulse counts associated with the closed status of the door is developed in the end point storage array 1017 in response to activation of a method of microprocessor end point calibration 1400. This method 1400 may be manually activated by a user upon installation of the door, and/or may be automatically activated, as desired.

Specific attention now is directed to FIGS. 2A, 2B, 8, 11, and 12 for a discussion of the door controller 183. While the microprocessor 157 monitors door status, the door controller 183 directs the motor 167 to move the door and thus controls the door position. The door controller 183 may also include a variety of logical modules interconnected on a logical bus 1217 and that interoperate to perform various methods.

For instance, the door controller 183 may include a pulse stream receiver 1201. The pulse stream receiver 1201 may comprise an input port of the door controller 183 configured to receive a pulse stream. The pulse stream may be a set of motor signal pulses indicative of at least one of a speed, distance, and direction of movement of the motor operable to move the door. This pulse stream may be generated by the optical encoder 166. In various instances, one pulse generator 168 or 169 provides the pulse stream associated with the pulse count captured by the pulse counter 1207 (discussed below), and both pulse generators 168 and 169 provide the pulse stream associated with the direction determination of the direction classifier 1205.

The door controller 183 also may include a pulse detector 1203. A pulse detector 1203 processes the pulse stream and identifies the pulses therein. In various embodiments, the pulse detector 1203 determines whether the pulse is a low-to-high pulse or a high-to-low pulse. In various embodiments, the pulse detector 1203 determines the period and duty cycle of one or more pulse of the pulse stream. The pulse detector 1203 may compare the pulses from pulse generator 168 and pulse generator 169. The pulse detector 1203 is operatively coupled, via a logical bus 1217, to a direction classifier 1205, a pulse counter 1207, and a pulse count error correction module 1209, as well as to a speed controller 1213, among further aspects.

The direction classifier 1205 determines, based on the relative pulse period and duty cycle and/or a comparison of pulses from pulse generator 168 to pulses from pulse generator 169, the direction in which the door is moving.

The pulse counter 1207 maintains an index that corresponds to a count of received pulses, indexed to an end point of travel of the door. In various embodiments, the pulse counter 1207 is indexed relative to the upper movement limit of a door. The pulse counter 1207 increments in response to each pulse detected by the pulse detector 1203 while the direction classifier 1205 indicates that the door is moving downwardly. The pulse counter 1207 decrements in response to each pulse detected by the pulse detector 1203 while the direction classifier 1205 indicates that the door is moving upwardly. In this manner, the pulse counter 1207 maintains a counter that accurately corresponds to an instantaneous position of the door.

The pulse count error correction module 1209 receives an indication from the pulse detector 1203 of the receipt of a pulse corresponding to the registration tab. The pulse count error correction module 1209 maintains a tally of pulses received between pulses corresponding to the registration tab. If the count of pulses between registration tabs is inaccurate, the pulse count error correction module 1209 adds or subtracts an appropriate number of pulses from the counter maintained by the pulse counter 1207 based on the known number of tabs on the wheel extant between the registration tabs.

The door controller 183 also includes an end point determination module 1211. The end point determination module 1211 compares the counter maintained by the pulse counter 1207 to a predetermined threshold number of pulses that corresponds to the arrival of the door at a position corresponding to a closed status. In response to the end point determination module 1211 determining that a door has a closed status, the end point determination module 1211 instructs a motor control engine 1215 to stop the motor 167, ending movement of the door. Notably, while the prior discussion of the microprocessor 157 elaborated at length regarding the evolution of the predetermined threshold number of pulses corresponding to the arrival of the door at a position corresponding to a closed status, the door controller 183 operates according to a different principle. Specifically, the end point determination module 1211 instructs the motor control engine 1215 to drive the motor 167 to move a garage door to a fixed pulse count associated with a closed status. Thus the door controller 183 is said to have a fixed set point corresponding to the end of travel of the garage door when the garage door closes. In various embodiments, the fixed set point also encompasses a tolerance range. For example, a number of pulses within four pulses of the fixed set point may be considered to also be associated with the closed status.

Figure 13:
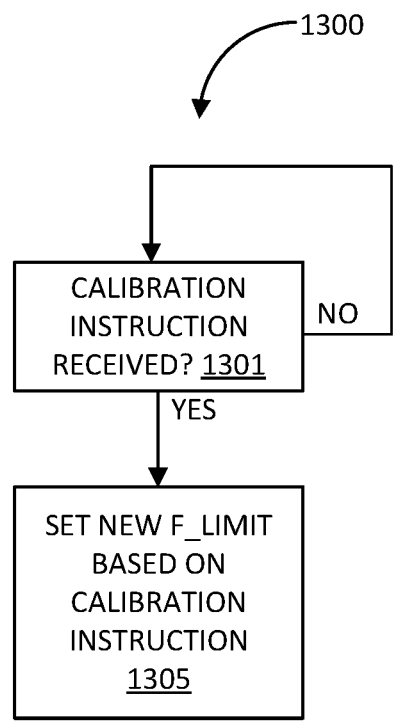
FIG. 13 shows a method of door controller end point calibration performed by the door controller of the remote movable barrier status monitoring and control system of FIG. 1.

The fixed set point may be calibrated by a method of door controller end point calibration 1300 shown in FIG. 13. Briefly, the end point determination module 1211 receives, from the system, a calibration instruction (block 1301). For instance, a user may press a button to indicate that the door is presently at a position that the user desires to designate as the closed end point of the range of motion of the door. In response, the pulse counter 1207 may provide the current pulse count to the end point determination module 1211 for storage as the closed end point of the range of motion of the door (block 1305).

The door controller 183 may include a speed controller 1213. The speed controller 1213 may instruct a motor control engine 1215 to increase or decrease the velocity of the motor 167 and thus the velocity of the door. In various instances, the door controller 183 slows the velocity of the door as the door reaches an open or closed end point, softening the abruptness of changes in motion of the door. The speed controller 1213 may also monitor the pulse detector 1203 and instruct the motor control engine 1215 to drive the motor 167 to a faster or slower speed based on the detected motion of the motor 167. In this manner, a feedback loop is established and facilitates real-time adjustment in response to changes in the behavior of the door. For instance, a door that is opening slowly may be weighed down by snow, thus the pulse detector 1203 indicates that the speed of movement of the motor 167 is less than expected by the speed controller 1213. In response, the speed controller 1213 may temporarily instruct the motor control engine 1215 to drive the motor at a greater velocity, to account for real-world sluggishness arising from changing conditions.

Finally, the door controller 183 includes a motor control engine 1215. The motor control engine 1215 generates drive waveforms to drive the motor 167. For instance, the motor control engine 1215 may generate one or more pulse width modulated current configured to drive the motor 167. The motor control engine 1215 may receive data instructions from other aspects of the door controller 183 and may generate drive waveforms to power the motor 167. In various embodiments, the motor control engine 1215 directs operation of a separate motor driver circuit.

Figure 11:
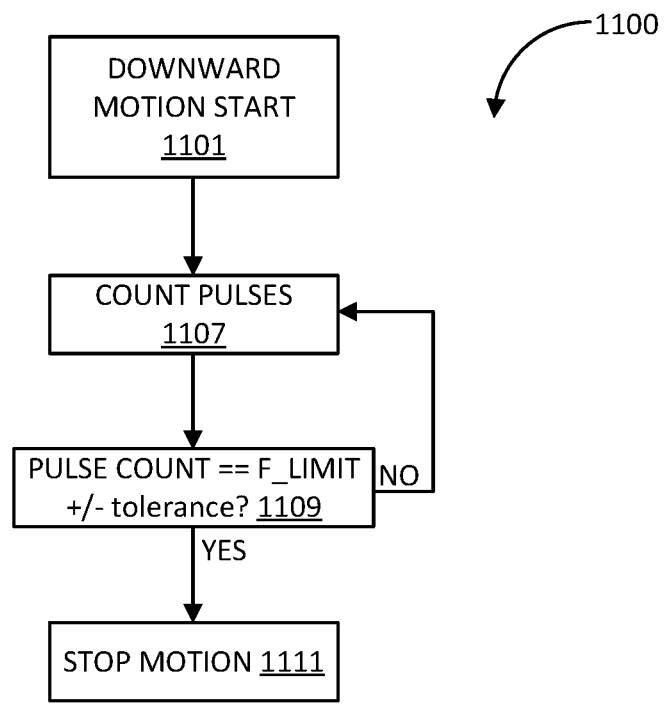
FIG. 11 shows a method of barrier closure operation performed by a door controller of the remote movable barrier status monitoring and control system of FIG. 1.
Figure 12:
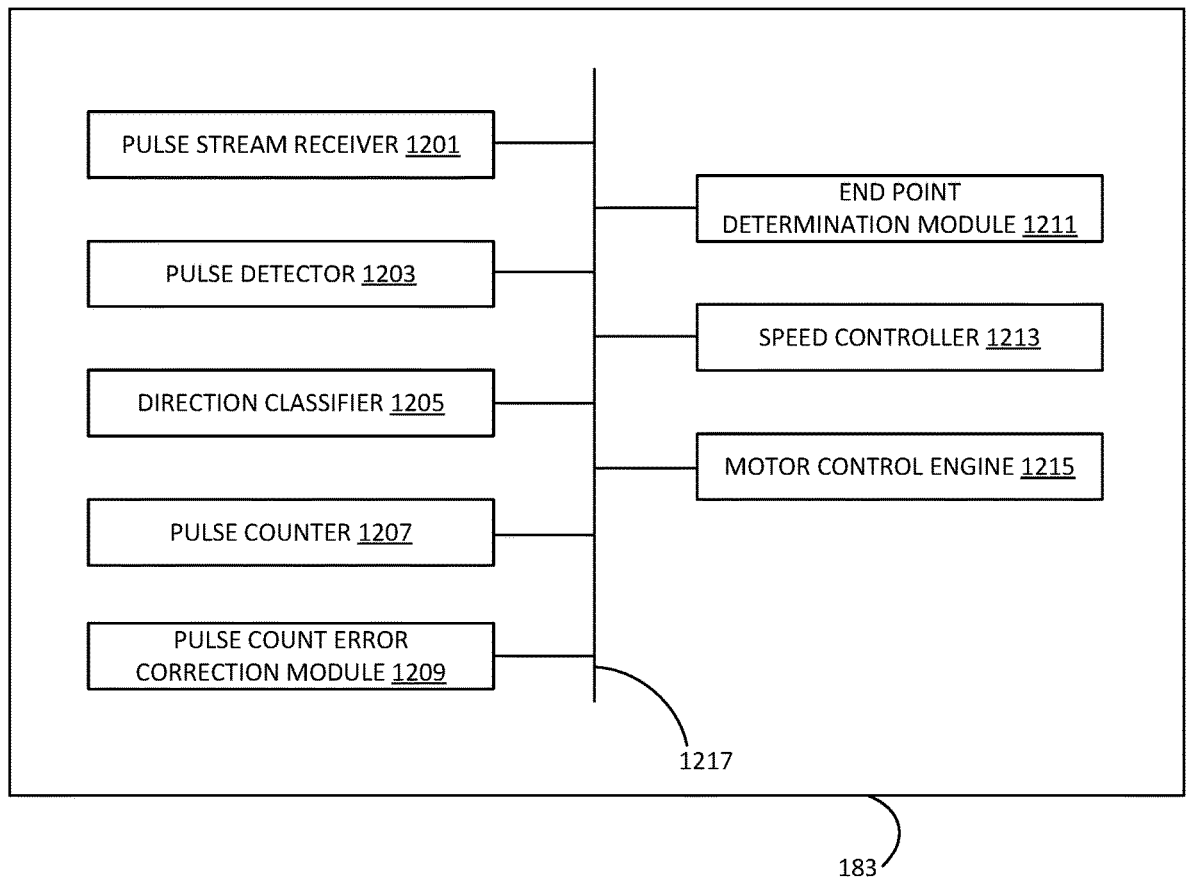
FIG. 12 shows aspects of a door controller of the remote movable barrier status monitoring and control system, in accordance with various embodiments.

Having discussed both the door controller 183 and the microprocessor 157, as well as a method of barrier closure monitoring 900 (FIG. 9) that the microprocessor 157 performs, additional attention is now directed to FIG. 11 for a discussion of a method of barrier closure operation performed by a door controller 183, often simultaneously with the performance of the method of barrier closure monitoring 900 by the microprocessor 157. Thus, one may appreciate that both the microprocessor 157 and the door controller 183 operate in parallel, both in response to the pulse stream, which is inputted to both the microprocessor 157 and the door controller 183 to provide input data for their different and independent operations.

The method of barrier closure operation 1100 includes various steps. While the steps are provided in a sequence for ease of discussion, one may appreciate that the steps may occur in different order and/or may occur simultaneously or may overlap in time. A pulse stream receiver 1201 of a door controller 183 may begin receiving a pulse stream, a pulse detector 1203 of the door controller 183 may detect pulses indicating that a closure motion has started (e.g., a door is moving), and the direction classifier 1205 of the door controller 183 may determine the direction of movement of the door is downward (e.g., toward closure) (block 1101). The pulse counter 1207 of the door controller 183 begins counting pulses (block 1107). The end point determination module 1211 begins comparing the pulse count to a fixed predetermined threshold number of pulses (F_LIMIT), which may also include a tolerance range such as plus or minus four pulses (block 1109). In various embodiments, the predetermined threshold number of pulses corresponds to a closed status of a garage door. In response to the pulse count equaling the predetermined threshold number of pulses (or being within the tolerance range of the predetermined threshold number of pulses), the garage door is determined to be closed and the motor control engine 1215 ceases motion of the motor 167 driving the garage door (block 1111). In response to the pulse count not equaling the predetermined threshold number pulses (or not being within the tolerance range of the predetermined threshold number of pulses), the method returns to block 1107 and pulse counter 1207 continues to count the pulses. In this manner, the door controller executes a method of barrier closure operation that determines whether to drive the motor 167 or not drive the motor 167 based on the pulse stream.

Returning to FIGS. 1, 2A, and 2B, in accordance with another feature of the system 10, electrical power is provided by power supply 181 not only to the garage door operator (GDO) 180, but also to the door control module 150 after conversion to a suitable voltage level by the DC/DC converter 156. The primary power supplied is 16 VAC, with a secondary 13.8 VDC line from a battery. The door control module 150 and garage door operator 180 share a common ground. It should be noted that in instances where the door control module 150 is operating on the 13.8 VDC line, the processor 155 may be shut down to conserve power.

Various type apparatus may be used for the pulse encoder 166. For example, an absolute position sensor may be used to detect the angular position of the rotatable motor shaft. An example of a suitable absolute position sensor that can be used as a magnetic pulse generator for pulse encoder 166 is described in U.S. Pat. No. 8,113,263, to Reed et al., issued Feb. 14, 2012, and entitled Barrier Operator With Magnetic Position Sensor, which is incorporated herein by reference in its entirety.

Various modifications may be made to the disclosed embodiments without departing from the principles of the present invention. For example, while the specific examples set forth-above describe transmitting the door status information, or transmitting the change-of-door-status command, via a separate Wi-Fi home router 94, it should be understood that this is a non-limiting example, and the router 94 may alternatively be part of the Internet 93.

Moreover, those skilled in the art, having benefit of this disclosure, will appreciate that other embodiments can be envisioned that do not depart from the spirit and scope of the invention as defined solely by the attached claims, and equivalents thereof.

What is claimed is:

1. A garage door status monitoring and control system comprising:
 a motor operable to move a garage door to alternate garage door positions and having a rotatable output shaft,
 an encoder comprising a rotary optical encoder operatively associated with the motor and configured to generate a pulse stream comprising motor signal pulses comprising optical pulses indicative of rotational movement of the rotatable output shaft,
 a door control module operatively coupled to the encoder and configured to receive the pulse stream,
 a garage door operator having a door controller operatively coupled to the encoder and configured to receive the pulse stream from the encoder independent of the door control module, and
 a wheel having spaced paddles projecting therefrom with spaces defined between the paddles, the wheel affixed to the rotatable output shaft for rotation therewith, wherein a plurality of the spaced paddles each comprise a first same width and a plurality of the spaces defined between the paddles each comprise a second same width,
 wherein the door control module has a programmably-controlled apparatus generating a digital door status signal indicative of one of the alternate garage door positions in response to the pulse stream, and
 wherein the garage door operator provides supervisory control over movement of the garage door based upon the pulse stream.

2. The garage door status monitoring and control system of claim 1 wherein the alternate garage door positions are open and closed.

3. The garage door status monitoring and control system of claim 1, further comprising a wireless transmitter for transmitting, via the Internet, to a remotely located Internet access device, door status position information corresponding to the digital door status signal.

4. The garage door status monitoring and control system of claim 1, wherein the alternate garage door positions correspond to predetermined counts of the motor signal pulses of the pulse stream.

5. The garage door status monitoring and control system of claim 1, wherein the encoder comprises a first pulse generator and a second pulse generator, the first pulse generator operable to generate motor signal pulses indicative of at least one of a speed and a distance of movement of the door and the combination of the first pulse generator and the second pulse generator operable to generate motor signal pulses indicative of a direction of movement of the motor.

6. The garage door status monitoring and control system of claim 5, wherein the pulse stream comprises the motor signal pulses of the first pulse generator and the motor signal pulses of the second pulse generator, wherein at least a portion of the motor signal pulses of the second pulse generator correspond to at least a portion of the motor signal pulses of the first pulse generator phase shifted between 67 and 68 degrees.

7. The garage door status monitoring and control system of claim 1, wherein the first same width and the second same width are identical.

8. The garage door status monitoring and control system of claim 1, wherein the wheel further comprises a dissimilar spaced paddle projecting therefrom and providing a registration tab comprising a width different from the first same width.

9. The garage door status monitoring and control system of claim 8, wherein motor signal pulses corresponding to passage of the spaced paddles past a pulse generator of the encoder are different than a motor signal pulse corresponding to passage of the registration tab past the pulse generator of the encoder.

10. An apparatus for monitoring and controlling a door status position of a movable barrier that is moved between first and second door status positions by a motor responding to door commands from a controller of a garage door operator, the apparatus comprising:
  an optical encoder for generating motor signal pulses indicative of movement of a rotatable output shaft of the motor and for inputting the motor signal pulses both to a programmably-controlled microprocessor and to the garage door operator, wherein the motor signal pulses are inputted to the garage door operator independent of the program m ably-controlled microprocessor;
  a wheel having spaced paddles projecting therefrom with spaces defined between the paddles, the wheel affixed to the rotatable output shaft of the motor for rotation therewith, wherein a plurality of the spaced paddles each comprise a first same width and a plurality of the spaces defined between the paddles each comprise a second same width;
  the programmably-controlled microprocessor configured to convert the motor signal pulses to a digital door status signal indicative of whether the movable barrier is at a first door status position or a second door status position; and
  the controller of the garage door operator configured to generate the door commands, the door commands providing supervisory control over the movement of the barrier based upon the motor signal pulses.

11. The apparatus as defined by claim 10, wherein the motor signal pulses comprise optical pulses initially generated by the optical encoder and thereafter converted to electrical pulses.

12. The apparatus as defined by claim 10, further comprising a wireless door status condition transmitter operably coupled to the programmably-controlled microprocessor, and not operably coupled to the controller, for transmitting door status information corresponding to the digital door status signal from the programmably-controlled microprocessor to a remote location.

13. The apparatus as defined by claim 10, wherein the first same width and the second same width are identical.

14. The apparatus as defined by claim 13, wherein the wheel further comprises a dissimilar spaced paddle projecting therefrom and providing a registration tab comprising a width different from the first same width.

15. The apparatus as defined by claim 14, wherein motor signal pulses corresponding to passage of the spaced paddles past a pulse generator of the optical encoder are different than a motor signal pulse corresponding to passage of the registration tab past the pulse generator of the optical encoder.

16. The apparatus as defined by claim 10, wherein the encoder comprises a first pulse generator and a second pulse generator, the first pulse generator operable to generate motor signal pulses indicative of at least one of a speed and a distance of movement of the door and the combination of the first pulse generator and the second pulse generator operable to generate motor signal pulses indicative of a direction of movement of the motor.

17. The apparatus as defined by claim 16, wherein at least a portion of the motor signal pulses of the second pulse generator correspond to at least a portion of the motor signal pulses of the first pulse generator phase shifted between 67 and 68 degrees.

18. A garage door status monitoring and control system comprising:
  a motor operable to move a garage door in an opening direction and in a closing direction,
  an encoder comprising a rotary optical encoder operatively associated with the motor and configured to generate a pulse stream comprising motor signal pulses indicative of movement of the motor and the door,
  a wheel having spaced paddles projecting therefrom with spaces defined between the paddles, the wheel affixed to a rotatable output shaft of the motor for rotation therewith, wherein a plurality of the spaced paddles each comprise a first same width and a plurality of the spaces defined between the paddles each comprise a second same width, and
  a door control module operatively coupled to the encoder for receiving the pulse stream, wherein the door control module counts motor signal pulses of the pulse stream;
  wherein the door control module generates a first digital door status signal indicative of the door having a closed status in response to the count of the motor signal pulses exceeding a threshold,
  wherein the door control module generates a second digital door status signal indicative of the door having a not closed status in response to the count of the motor signal pulses not exceeding the threshold, and
  wherein the door control module is configured to change the threshold based upon:
    a number of pulses corresponding to a closed position of the door drifting from the threshold over time; or an input from a user indicating a change to the closed position.

\* \* \* \* \*

UNITED STATES PATENT AND TRADEMARK OFFICE
CERTIFICATE OF CORRECTION

| | |
|---|---|
| PATENT NO. | : 11,393,331 B2 |
| APPLICATION NO. | : 16/237157 |
| DATED | : July 19, 2022 |
| INVENTOR(S) | : Ikeler et al. |

It is certified that error appears in the above-identified patent and that said Letters Patent is hereby corrected as shown below:

In the Claims

Column 17, Line 50, change "program m ably" to -- programmably --

Signed and Sealed this
Twenty-second Day of November, 2022

*Katherine Kelly Vidal*

Katherine Kelly Vidal
*Director of the United States Patent and Trademark Office*